(12) United States Patent
Chang

(10) Patent No.: US 6,636,171 B2
(45) Date of Patent: Oct. 21, 2003

(54) AUTOMOBILE BI-DIRECTION REMOTE CONTROL TRANSMISSION CIRCUITRY

(76) Inventor: Chen-Ping Chang, 2F, No. 7-1, Ming Lee St., Chung Ho City, Taipei Hsien (TW)

( * ) Notice: Subject to any disclaimer, the term of this patent is extended or adjusted under 35 U.S.C. 154(b) by 306 days.

(21) Appl. No.: 09/759,454

(22) Filed: Jan. 16, 2001

(65) Prior Publication Data

US 2002/0093448 A1 Jul. 18, 2002

(51) Int. Cl.[7] .............................. G08C 19/12
(52) U.S. Cl. ............ 341/173; 341/176; 340/825.69; 340/825.72; 455/75; 348/734
(58) Field of Search .................. 341/173, 176; 455/142, 143, 145, 75; 340/825.69, 825.72; 348/734

(56) References Cited

U.S. PATENT DOCUMENTS

| | | | | |
|---|---|---|---|---|
| 3,931,575 A | * | 1/1976 | Amoroso, Jr. | 455/75 |
| 3,935,533 A | * | 1/1976 | Amoroso, Jr. | 455/75 |
| 4,229,741 A | * | 10/1980 | Groth, Jr. | 370/294 |
| 5,444,737 A | * | 8/1995 | Cripps et al. | 375/219 |
| 5,493,583 A | * | 2/1996 | Cripps | 375/219 |
| 5,533,056 A | * | 7/1996 | Cripps | 375/286 |
| 5,721,783 A | * | 2/1998 | Anderson | 381/328 |
| 6,163,538 A | * | 12/2000 | Brown et al. | 370/389 |
| 6,452,909 B1 | * | 9/2002 | Bauer | 370/280 |

* cited by examiner

Primary Examiner—Michael Horabik
Assistant Examiner—Albert K. Wong
(74) Attorney, Agent, or Firm—Birch, Stewart, Kolasch & Birch, LLP

(57) ABSTRACT

An automobile remote control circuitry. There are wireless transmission circuitry and wireless receiving circuitry each on the remote control itself and the circuitry inside the automobile. The special feature: the wireless transmission circuitry and wireless receiving circuitry apply the same specification of LO base band frequency circuitry. Based on above structure, it can reduce the number of components used in the bi-direction remote control, lower the total component cost and easier in manufacture processes.

3 Claims, 4 Drawing Sheets

AUTOMOBILE BI-DIRECTION REMOTE CONTROL TRANSMISSION CIRCUITRY

BACKGROUND OF THE INVENTION

I. Field of the Invention

This invention relates to the automobile bi-direction remote control circuitry. There are wireless transmission circuitry and wireless receiving circuitry each on the remote control itself and the circuitry inside the automobile. The special feature of this invention is that the wireless transmission circuitry and wireless receiving circuitry apply the same specification of LO base band frequency circuitry. Based on this structure, it can reduce the number of components used in the bi-direction remote control, lower the circuitry cost and easy to manufacture.

II. Description of the Prior Art

Heretofore, current automobile remote controls have two types: the more popular single direction and the newer bi-direction inter-active controller. The current bi-direction remote control design as shown in FIG. 1 contains transmitting circuitries a,a', and receiving circuitries b,b', both circuitry connect to push button c and the control circuitries d,d'. When the desired instruction is pressed from the push button c, the signal is generated from the transmission circuitry a and emitted from antenna e' to the circuitry inside the automobile. The circuitry inside the automobile receives the signal through antenna e and receiving circuitry b'. The signal is then sent into control circuitry d' to execute the open door, lock door, start engine or initiate alarm system tasks. At the same time, the control circuitry d' inside the automobile returns a signal back to the remote control through its control circuitry a' and antenna e'. The remote control receives the feedback signal from antenna e and receiving circuitry b, finally to the control circuitry d, and converts the signal into images and display to confirm the success of the given instruction. These confirmations avoid error instructions and signal miss receiving conditions.

As shown on FIG. 2, current bi-direction remote control system has two wireless transmission circuitries a,a' and wireless receiving circuitries b,b' on both remote control side and the circuitry inside the automobile. The two sets of circuitry are independent of each other. It functions as following: on the remote control side, the signals are transmitted from the wireless transmission circuitry a first and then passes through the LO base band frequency circuitry a1, amplified by the signal amplifier a2, finally those signals are emitted from the Antenna e. On the automobile side, these signals are received through the antenna e', then are amplified by the signal amplifier b1', then go to the combination circuitry that is in parallel of the signal mixer b2' and the LO base band frequency circuitry b3'; after the parallel circuitry, the signals now are converted into low frequency wave, then pass through the signal filter b4' and the AM frequency sampler b5', finally they reach the control circuitry d' to finish the tasks. As described above, the control signals are initiated from the push button of the remote control; the feedback signals are triggered from the circuitry inside the automobile when it receives the control signals.

The major flaw of current remote control system design is: the wireless transmission circuitry and the wireless receiving circuitry are two independent circuitry; each of them equipped with an independent LO base band frequency circuitry to generate their base band frequency. This flaw not only increases the number of components but also might cause misplace for the different frequency circuitry, this further increases the cost and processes during manufacturing.

SUMMARY OF THE INVENTION

It is therefore a primary object of the invention to provide a new bi-direction remote control signal transmission circuitry design, wherein the remote control circuitry and the circuitry inside the automobile have the same specification. The wireless transmission circuitry and the wireless receiving circuitry apply the same LO base band circuitry, they are connected in the signal mixer of the wireless receiving circuitry and the signal amplifier of the wireless transmission circuitry. The invention can reduce the number of components and simplify the processes of manufacturing thus lower the total cost.

BRIEF DESCRIPTION OF THE DRAWINGS

The accomplishment of the above-mentioned object of the present invention will become apparent from the following description and its accompanying drawings which disclose illustrative an embodiment of the present invention, and are as follows.

DESCRIPTION OF THE PREFERRED EMBODIMENT

Figure 1:
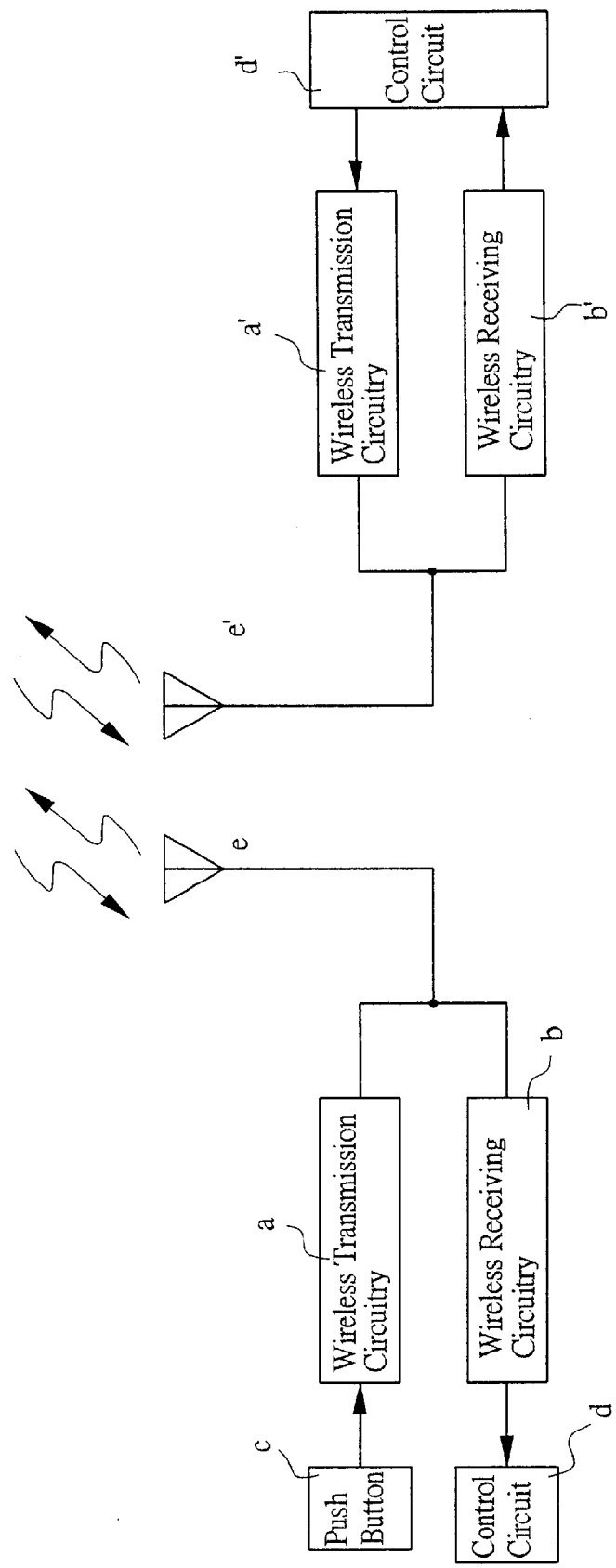
FIG. 1 is a block diagram according to the prior art.
Figure 2:
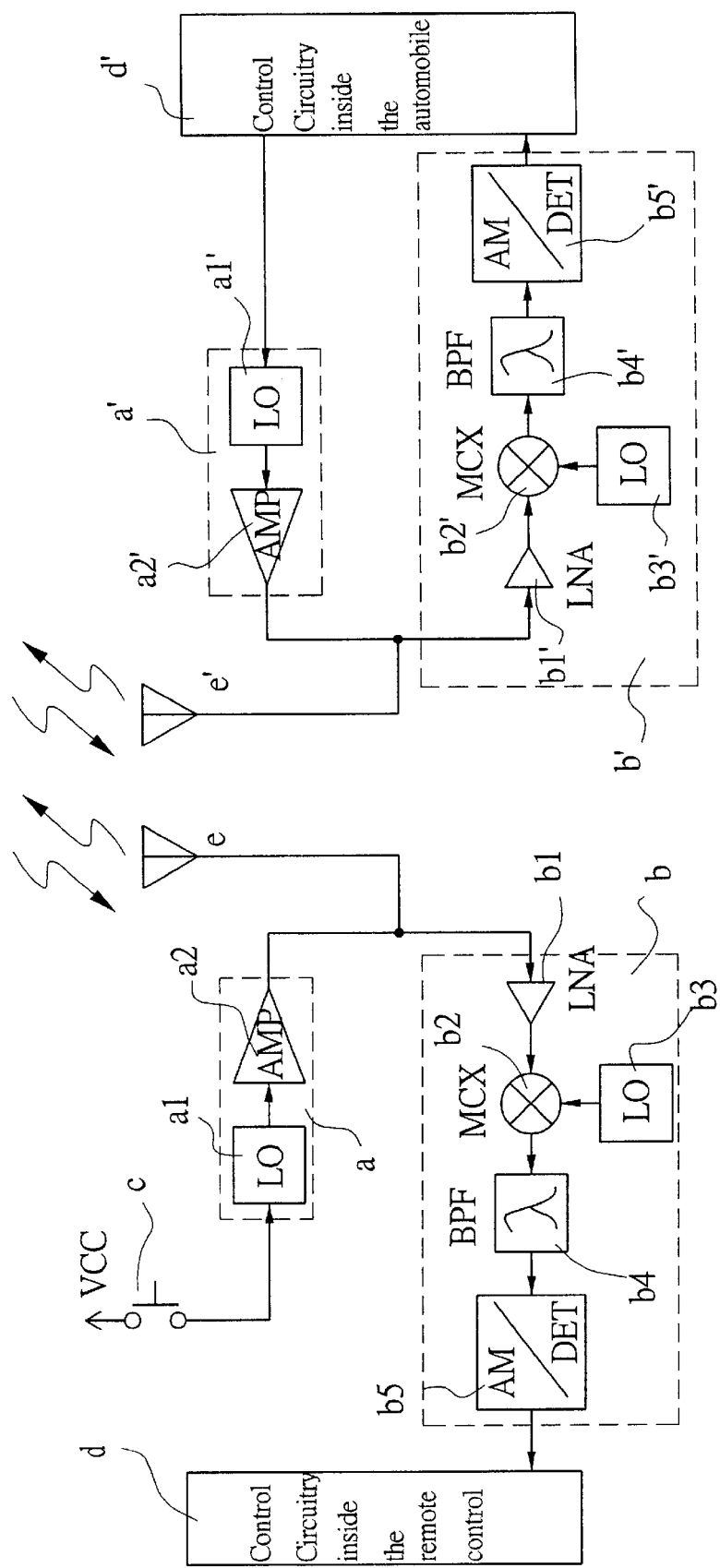
FIG. 2 is a schematic diagram of the circuitry according to the prior art.
Figure 3:
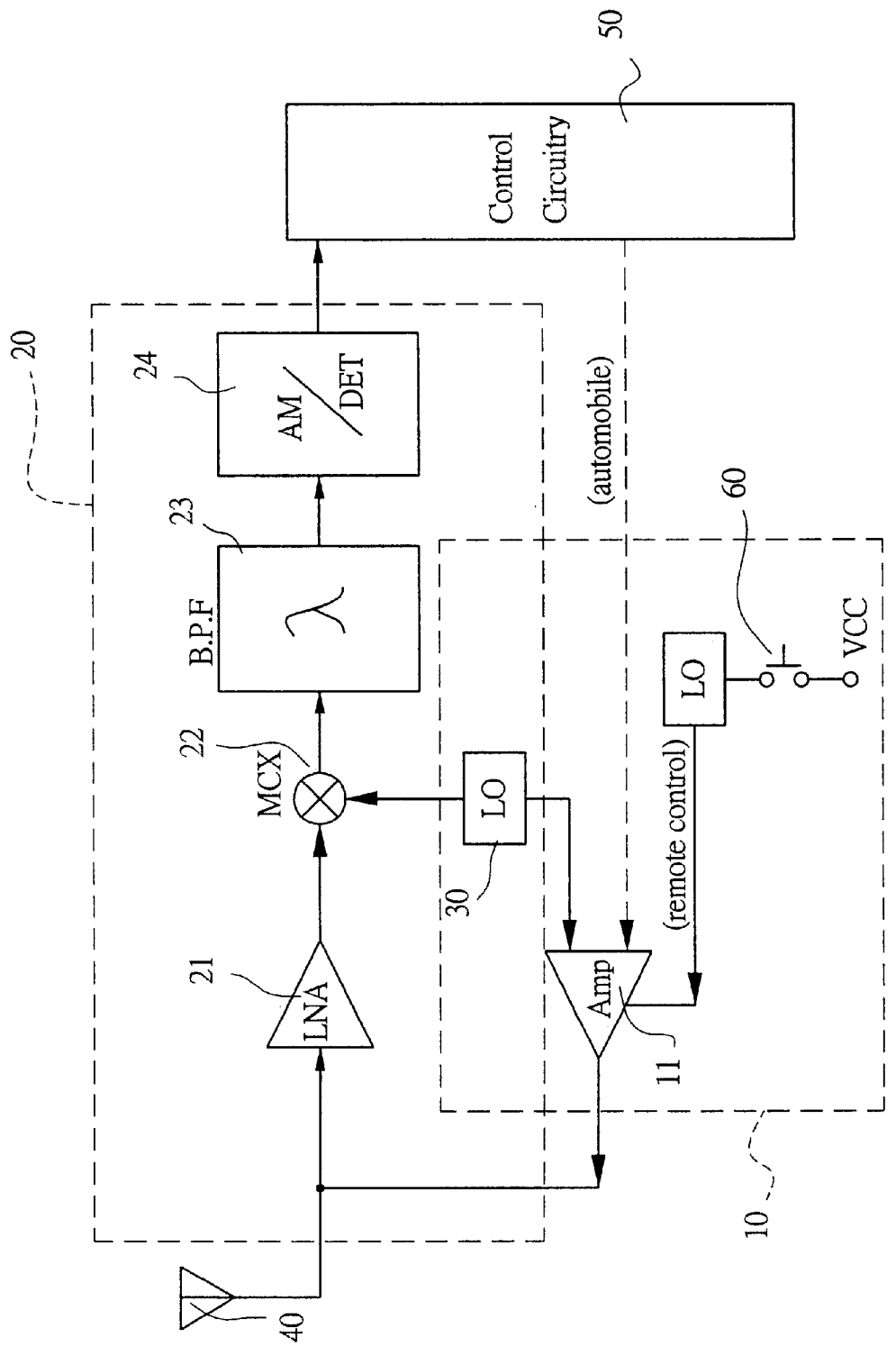
FIG. 3 is a schematic diagram of the circuitry of the present invention.

Referring to FIG. 3, the automobile bi-direction remote control transmission circuitry consists of the wireless transmission circuitry 10 and the wireless receiving circuitry 20. (This drawing shows the transmission circuitry of the remote control circuitry and the control circuitry inside the automobile with the same figure) The wireless transmission circuitry 10 consists of a signal amplifier 11 and a LO base band frequency circuitry 30. When the push button 60 of the remote control or the control circuitry inside the automobile 50 sends out the control signals to signal amplifier 11. The signals trigger the LO base band frequency circuitry 30 to send the harmonic frequency to the signal amplifier 11, and transmit the harmonic frequency out through antenna 40.

The wireless receiving circuitry consists of a signal amplifier 21, a signal mixer 22, a signal filter 23, an AM frequency sampler 24, and a LO base band frequency circuitry 30 which is connected parallel to the signal mixer 22. Following is the signal flow sequence: the signals are received by the antenna 40, then amplified by signal amplifier 21, the frequency of the signal is lowered in the signal mixer based on the frequency sent by the LO base band frequency circuitry 30. The signals then pass through the signal filter 23 and the AM frequency sampler 24, finally enter the control circuitry to execute the preset instruction. Based on above description, the major feature of this invention is: the LO base band frequency circuitry 30 of the wireless transmission circuitry 10 and the wireless receiving circuitry 20 is the same one.

Figure 4:
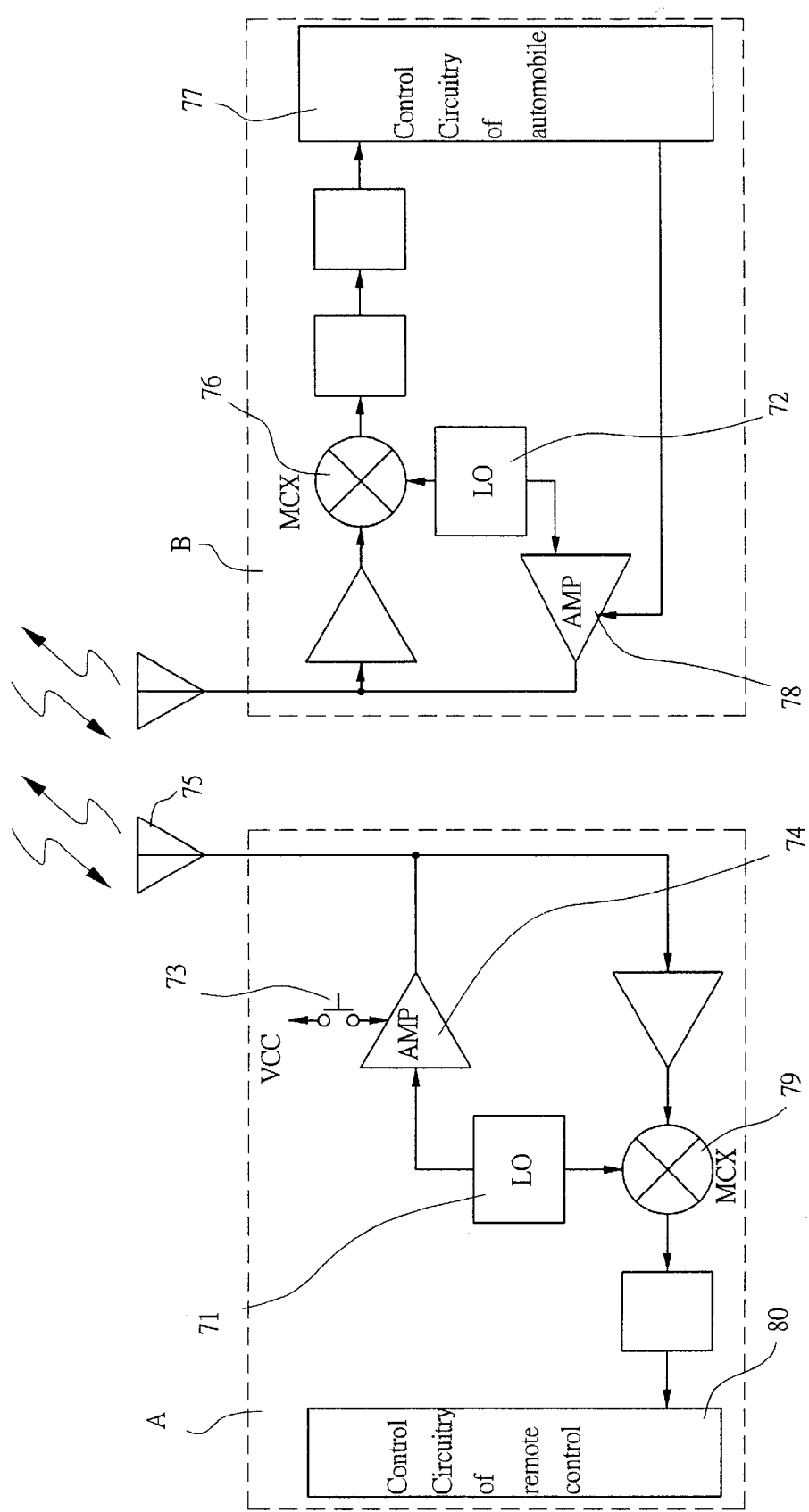
FIG. 4 is a schematic diagram of the circuitry of an embodiment according to the present invention.

A real function sample as follows: referring to FIG. 4, the said structure is applied and assuming the frequency of the LO base band frequency circuitry 71 of the remote control A is 315 Mhz; the frequency of the LO base band frequency circuitry 72 of the control circuitry in the automobile B is 305 Mhz. When the user presses the push button 73 of the remote control A, a signal is sent to signal amplifier 74, and transmit out a signal at 315 Mhz through the antenna 75.

Once the control circuitry in the automobile B receives the signal, the signal is then combined with the frequency (305 Mhz) generated by the LO base band frequency circuitry 72 in the signal mixer 76. After the combination, a frequency difference 10.7 Mhz is generated, eventually the signal enters the control circuitry 77 and executes the preset instruction. At the same time the control circuitry 77 triggers a feedback signal, the feedback signal enters the signal amplifier 78 and is sent out at the base band (305 Mhz) of the LO base band frequency circuitry 72. When the remote control A receives the feedback signal, a same frequency difference 10.7 Mhz is generated in the signal mixer 79, the difference is against the base band frequency 315 Mhz by the LO base band frequency circuitry 71. The feedback signal eventually enters the control circuitry 80 and executes the preset inter-active instructions.

As described above, this invention can do the same functions and achieve the same results as other bi-direction inter-active remote controls, but reduce the number of components and simplify the assembly processes, it also reduces the errors in manufacturing for having two different LO base band frequency circuitry.

The manufacturers can set the base band frequency on each remote control; every remote control can have different transmission and receiving frequency, this can avoid the interference situation among remote controls. The application of PLL and VCO to achieve the same LO base band frequency is not in the condition of this invention (ie. walkie talkie). The cost is too high for PLL or software programming in the automobile remote control application.

While a preferred embodiment of the invention has been shown and described in detail, it will be readily understood and appreciated that numerous omissions, changes and additions may be made without departing from the spirit and scope of the invention.

What is claimed is:

1. A bi-direction signal transmission circuit for an automobile, comprising:

a wireless receiving circuit including: a signal amplifier, a signal mixer, a signal filter, an AM frequency sampler and an LO frequency circuit having two outputs with a first output connected in parallel to said signal mixer, wherein a signal from an antenna is first amplified by said signal amplifier whereupon the signal is modulated in accordance with a base frequency from said LO frequency circuit to be a control circuit of low frequency, and whereupon the signal passes through said signal filter and said AM frequency sampler to a control circuit for performing preset procedures; and a wireless transmission circuit having a signal amplifier connected to a second output of said LO frequency circuit wherein the base frequency from said LO frequency circuit of said wireless receiving circuit is initiated to said signal amplifier for amplification as soon as a trigger signal is sent from said control circuit to said signal amplifier, whereupon the amplified signal is sent out by said antenna.

2. A system according to claim 1 wherein the bi-directional signal transmission circuit is in communication with a mobile phone.

3. The system according to claim 2, wherein the frequency of the LO frequency circuit in the automobile has a different frequency than the frequency of a LO frequency circuit in a remote control.

* * * * *